US009422475B2

(12) United States Patent
Cheong et al.

(10) Patent No.: US 9,422,475 B2
(45) Date of Patent: Aug. 23, 2016

(54) OPTICALLY ANISOTROPIC COMPOUND AND RESIN COMPOSITION COMPRISING THE SAME

(75) Inventors: Jaeho Cheong, Daejeon (KR); Minjin Ko, Daejeon (KR); Kiyoul Lee, Daejeon (KR); Bumgyu Choi, Seo-gu (KR); Myungsun Moon, Daejeon (KR); Daeho Kang, Daejeon (KR); YunBong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 257 days.

(21) Appl. No.: 12/451,853

(22) PCT Filed: Jun. 4, 2008

(86) PCT No.: PCT/KR2008/003119
§ 371 (c)(1),
(2), (4) Date: Dec. 3, 2009

(87) PCT Pub. No.: WO2008/150093
PCT Pub. Date: Dec. 11, 2008

(65) Prior Publication Data
US 2010/0137484 A1    Jun. 3, 2010

(30) Foreign Application Priority Data

Jun. 5, 2007   (KR) .................. 10-2007-0055005

(51) Int. Cl.
| C09K 19/10 | (2006.01) |
| C09K 19/16 | (2006.01) |
| C09K 19/20 | (2006.01) |
| C09K 19/18 | (2006.01) |
| C09K 19/28 | (2006.01) |
| C09K 19/30 | (2006.01) |
| C09K 19/34 | (2006.01) |
| C09K 19/04 | (2006.01) |

(52) U.S. Cl.
CPC ........... *C09K 19/2007* (2013.01); *C09K 19/16* (2013.01); *C09K 19/18* (2013.01); *C09K 19/28* (2013.01); *C09K 19/3059* (2013.01); *C09K 19/3461* (2013.01); *C09K 2019/0444* (2013.01)

(58) Field of Classification Search
None
See application file for complete search history.

(56) References Cited

U.S. PATENT DOCUMENTS

| 3,284,405 A * | 11/1966 | Coran ...................... C08K 5/12 524/293 |
| 3,345,400 A * | 10/1967 | Anagnostopoulos .... C08K 5/12 524/290 |
| 3,519,599 A | 7/1970 | Newland et al. |
| 4,474,679 A * | 10/1984 | Dubois .................. C07C 65/21 252/299.65 |
| 6,201,045 B1 | 3/2001 | Koike |
| 6,586,515 B1 | 7/2003 | Koike |
| 9,017,778 B2 * | 4/2015 | Jang ...................... C09J 133/08 349/96 |
| 9,045,671 B2 * | 6/2015 | Han ....................... C09J 133/08 |
| 2010/0105816 A1* | 4/2010 | Cheong et al. .............. 524/265 |
| 2011/0051051 A1* | 3/2011 | Han et al. ....................... 349/96 |
| 2011/0111140 A1* | 5/2011 | Jang ...................... C09J 7/0217 428/1.33 |
| 2011/0177262 A1* | 7/2011 | Kim ...................... C09J 133/08 428/1.54 |

FOREIGN PATENT DOCUMENTS

| FR | 2797877 | 3/2001 |
| JP | 58-118544 | 7/1983 |
| JP | 63-265682 | 11/1988 |
| JP | 02-129211 | 5/1990 |
| JP | 03179323 A * | 8/1991 |
| JP | 06157390 A * | 6/1994 |
| JP | 1996-110402 A | 4/1996 |
| JP | 2000-044614 | 2/2000 |
| JP | 2004-035347 | 2/2004 |
| JP | 2005-68374 A | 3/2005 |
| JP | 2005-307142 | 11/2005 |
| JP | 2006-045468 | 2/2006 |
| JP | 2006-353592 | 12/2006 |
| KR | 2001-101113 A | 11/2001 |

OTHER PUBLICATIONS

Yoshizawa, Atsushi, et al. "The Role of a Liquid Crystal Oligomer in Stabilizing Blue Phases" Liquid Crystals (2007), 34(9), 1039-1044.*
Imrie, C.T., et al. Liquid Crystals (1989(, 6(1), 1-10.*
Percec et al. Macromolecules, 24(17) 1991, 4957-4962.*
Linnartz et al., Eur. J. Org. Chem. 2003, 4819-4829.*
Gilman et al. JACS (1957), 79: 2281-2283.*
Mahajan, Parasitology (2005), 131, pp. 459-466.*
Lightowler et al. Brit. J. Pharmacol. (1964), 22, pp. 221-227.*
Klarmann et al. JACS (1926), 48, pp. 791-794.*
Campbell, Journal of Organic Chemistry (1961), 26, pp. 2480-2481.*

(Continued)

*Primary Examiner* — Nyeemah A Grazier
(74) *Attorney, Agent, or Firm* — Dentons US LLP

(57) ABSTRACT

Disclosed is a compound having high optical anisotropy and high compatibility with a polymer resin, which is represented by Formula 1 and necessarily has at least one meta substituent. Also, a resin composition including the compound and a polymer resin, and an optical member including the resin composition are disclosed. Since the compound represented by Formula 1 is an anisotropic compound having high compatibility with a polymer resin and high optical anisotropy, in the case of an optical member obtained by using a polymer resin composition including the compound represented by Formula 1, there is no phase separation, and it is possible to achieve a required optical characteristic with only a small amount thereof.

17 Claims, 3 Drawing Sheets

(56) References Cited

OTHER PUBLICATIONS

Kumar, S. et al. Indian Journal of Chemistry, Section B: Organic Chemistry Including Medicinal Chemistry (1983), 22B(1), pp. 17-22.*

Wild, et al. Liquid Crystals, vol. 33:6, pp. 635-644 (Jun. 2006).*

Yoshizawa, Atsushi Liquid Crystals vol. 34:9, pp. 1039-1044 (Sep. 2007).*

Imrie et al. "the preparation and properties of low molar mass liquid crystals possessing lateral alkyl chains", Liquid Crystals, vol. 6, No. 1, pp. 1-10, 1989.

Lim et al. "Synthesis of Polycatenar-type organogelators based on chalcone and study of their supramolecular architectures", Chem. Mater., vol. 19, pp. 460-467, 2007.

Cosa et al. "Absolute rate constants for water protonation of 1-(3-benzoylphenyl)alkyl carbanions", Organic Letters, vol. 4, No. 18, pp. 3083-3085, 2002.

Wong et al. "control of the arrangement of dipolar orientation of pyrimidine inside the conjugated backbone", Organic Letters, vol. 3, No. 2, pp. 173-175, 2001.

Linnartz. P, et al, European Journal of Organic Chemistry, 2003, vol. 24, pp. 4819-4829.

Affeld. A., et al, European Journal of Organic Chemistry, 2001, vol. 15, pp. 2877-2890.

Yelamaggad, et al; Chemistry of Materials, vol. 18, No. 26, 2006, pp. 6100-6102.

* cited by examiner

OPTICALLY ANISOTROPIC COMPOUND AND RESIN COMPOSITION COMPRISING THE SAME

This application claims the benefit of PCT/KR2008/003119 filed on Jun. 4, 2008, along with Korean Patent Application No. 10-2007-0055005 filed on Jun. 5, 2007, both of which are hereby incorporated herein by reference for all purposes in their entirety.

TECHNICAL FIELD

The present invention relates to a compound having high compatibility with a polymer resin and high optical anisotropy. Also, the present invention relates to a resin composition including the compound, and an optical member including the resin composition.

BACKGROUND ART

Recently, with the development of the electronics industry, the use of a polymer resin for optical use has rapidly increased. For example, the demand for various polymer materials for optical use, such as an optical disc substrate used as a storage medium, an optical lens, an optical fiber used for optical communication, a fresnel lens for a projection screen, a prism sheet used in a liquid crystal display, a protective film for a polarizing plate, a compensation film, etc., has been rapidly increased.

Such polymer resins for optical use are usually required to be optically isotropic, but a polymer resin of a final product may be anisotropic due to its own structure or stress during the process. Also, an optical resin, when inserted in a multi-layered structure, may have optical anisotropy by thermal expansion/contraction between respective layers.

When a film, lens, etc. with such an optical anisotropy exists in an optical path, a property of the phase may be changed, thereby adversely affecting signal reading. Therefore, it is preferable to use an optical member including an optical resin of which anisotropy is reduced as much as possible.

On the other hand, optical birefringence may be artificially given. For example, in the case of a liquid crystal display, the contrast at an inclined viewing angle may be degraded due to optical birefringence caused by the liquid crystal and a polarizing film. In order to solve this problem, a polymer resin having optical anisotropy with a certain direction may be used to compensate the birefringence caused by the liquid crystal and the polarizing film, thereby improving a viewing angle. In the case of a polymer resin for optical use as mentioned above, the optical characteristic is required to be controlled in a required direction.

As a conventional technology of controlling the optical characteristic of a polymer, a birefringence control method through adjustment of the structure of a polymer resin, such as Japanese Laid-Open Patent Nos. 1990-129211 and 2000-044614, has been known. However, the method has a problem in that the composition of a monomer of a copolymer is required to be changed to control the birefringence, and the change in the composition of the monomer may change other physical properties of the polymer resin.

Also, as a birefringence control method of a polymer resin, methods of adding an anisotropic material have been known. Japanese Laid-Open Patent No. 2004-035347 disclosed a method of introducing a needle-shaped inorganic particle as an anisotropic material to adjust an optical characteristic. However, in the case of an inorganic fine particle, it is difficult to uniformly disperse the particle in a solvent due to low solubility in the solvent and high density, and there is a possibility that the particle is subject to aggregation due to low stability, thereby reducing the transparency of the polymer resin. Also, Japanese Laid-Open Patent No. Hei 8-110402 disclosed a method of adjusting the optical characteristic of a polymer resin by adding a low-molecular organic compound. In general, compounds with high anisotropy have disadvantages, such as high crystallinity, low solubility in a solvent, and low compatibility with the polymer resin. Thus, the compounds, when mixed, may be precipitated by crystallization, and may be not dissolved in a solvent. However, there is no specific solution for such problems.

DISCLOSURE

Technical Problem

Therefore, the present invention has been made in view of the above-mentioned problems. The present invention provides an optically anisotropic compound, which has high optical anisotropy and high solubility in a solvent, can effectively control the optical characteristic of a polymer resin with only a small amount thereof, and does not cause a problem, such as precipitation, due to high compatibility with the polymer resin.

Also, the present invention provides a resin composition including the optically anisotropic material and the polymer resin.

Technical Solution

In accordance with an aspect of the present invention, there is provided a compound represented by Formula 1.

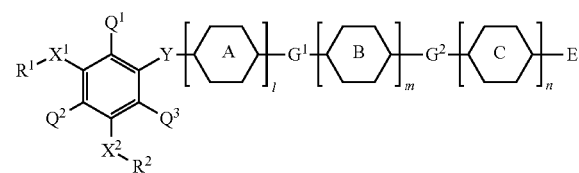

[Formula 1]

In formula 1,

represents

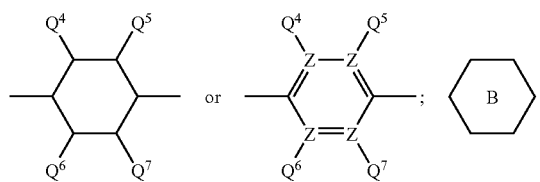

represents

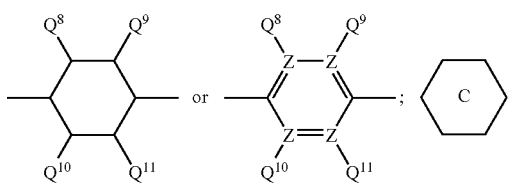

represents

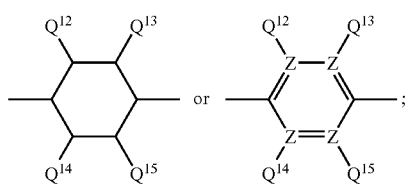

each of $Q^1$ to $Q^{15}$ independently represents —H, —F, —Cl, —Br, —I, —CN, —CF$_3$, —OCF$_3$, —R$^3$, —OR$^3$, —NHR$^3$, —NR$^3$R$^3$ or —C(=O)R$^3$;

Z represents C or N, and herein, if Z is N, there is no bond with corresponding $Q^4$ to $Q^{15}$;

each of l, m and n independently represents an integer of 0 to 2, and l+m+n is an integer equal to or more than 1;

each of Y, $G^1$ and $G^2$ independently represents —O—, —NR$^3$—, —S—, —SO—, —SO$_2$—, —(CH$_2$)$_q$—, —CH=CH—, —C≡C—, —C(=O)O(CH$_2$)$_q$—, —OC(=O)(CH$_2$)$_q$—, —(CH$_2$)$_q$C(=O)O—, —(CH$_2$)$_q$OC(=O)—, —(=O)(CH$_2$)$_q$—, —(CH$_2$)$_q$C(=O)—, —C(=O)NR$^3$(CH$_2$)$_q$—, —(CH$_2$)$_q$NR$^3$C(=O)—, —C(=O)S(CH$_2$)$_q$—, or —(CH$_2$)$_q$SC(=O)—, and q is an integer of 0 to 5;

E represents —H, —F, —Cl, —Br, —I, —CN, —NCO, —NCS, —R$^3$, —OR$^3$, —CF$_3$, or —OCF$_3$;

each of $X^1$ and $X^2$ independently represents —O—, —NR$^3$—, —S—, —SO—, —SO$_2$—, —(CH$_2$)$_p$—, —C(=O)NR$^3$—, —NR$^3$C(=O)—, —NR$^3$C(=O)NR$^3$—, —C(=O)(=O)—, —C(=O)O—, or —OC(=O)O—, and p represents an integer of 0 to 2;

each of $R^1$, $R^2$ and $R^3$ independently represents —H, $C_1$~$C_{20}$ alkyl, $C_1$~$C_{20}$ fluoroalkyl, $C_2$~$C_{20}$ alkenyl, $C_2$~$C_{20}$ fluoroalkenyl, $C_2$~$C_{20}$ alkynyl, $C_2$~$C_{20}$ fluoroalkynyl, —(CH$_1$CH$_2$O)$_r$CH$_3$—, —(CH$_2$CHCH$_3$O)$_r$CH$_3$, or —(CHCH$_3$CH$_2$O)$_r$CH$_3$, and r is an integer of 1 to 5; and at least one of $X^1$—$R^1$ and $X^2$—$R^2$ is not —(CH$_2$)$_p$—H, in which p is 0.

In accordance with another aspect of the present invention, there is provided a resin composition including a polymer resin and the compound represented by Formula 1.

In accordance with a further aspect of the present invention, there is provided an optical member including the resin composition.

Advantageous Effects

A compound represented by Formula 1 of the present invention has high compatibility with a polymer resin and high optical anisotropy. Accordingly, in the case of an optical member obtained by using a polymer resin composition including the compound represented by Formula 1, there is no phase separation, and it is possible to achieve a required optical characteristic with only a small amount thereof.

BEST MODE

Figure 1:
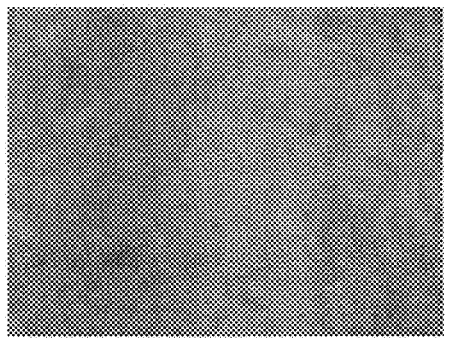
FIG. 1 is an optical microscopic photograph (×5) showing the result of the compatibility test according to Example 8.

Hereinafter, the present invention will be described in detail.

The compound represented by Formula 1 of the present invention is an optically anisotropic compound having refractive anisotropy of 0.2 or more, and necessarily has at least one meta substituent. In other words, in Formula 1, at least one of $X^1$—$R^1$ and $X^2$—$R^2$ is not —(CH$_2$)$_p$—H, in which p is 0, and thus the compound represented by Formula 1 is a compound having a substituent introduced at $X^1$—$R^1$ and/or $X^2$—$R^2$, that is, the meta position at one side end of a mesogenic core.

In the compound represented by Formula 1 of the present invention, at least one meta substituent increases the compatibility with a polymer resin, and improves physical properties, such as solubility, a melting point, etc. as compared to a conventional para substituent or ortho substituent.

Accordingly, the compound represented by Formula 1 of the present invention is easily mixed with various polymer resins, and has high solubility, even at low temperatures. In addition, the compound is physically and chemically stable under the condition where a liquid crystal display device is usually used, and is stable under heat and light.

Therefore, the compound represented by Formula 1 may be mixed with various polymer resins to control the optical characteristic of a polymer resin.

In the compound represented by Formula 1 of the present invention, examples of $C_1$~$C_{20}$ alkyl of $R^1$, $R^2$ and $R^3$ include linear or branched alkyls, such as —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, etc., but the present invention is not limited thereto. Also, $C_1$~$C_{20}$ fluoroalkyl of $R^1$, $R^2$ and $R^3$ includes at least one fluorine group substituting for hydrogen of the alkyl group as defined above.

Also, examples of $C_2$~$C_{20}$ alkenyl of $R^1$, $R^2$ and $R^3$ include linear or branched alkenyls, such as —CH=CH$_2$, —CH=CHCH$_3$, —CCH$_3$=CH$_2$, —CH$_2$CH=CH$_2$, —CH=CHCH$_2$CH$_3$, —CH=C(CH$_3$)$_2$, —CCH$_3$=CHCH$_3$, —CH$_2$CH=CHCH$_3$, —CH$_2$CCH$_3$=CH$_2$, —CHCH$_3$CH=CH$_2$, —CH$_2$CH$_2$CH=CH$_2$, etc., but the present invention is not limited thereto. Also, $C_2$~$C_{20}$ fluoroalkenyl of $R^1$, $R^2$ and $R^3$ includes at least one fluorine group substituting for hydrogen of the alkenyl group as defined above.

Also, examples of $C_2$~$C_{20}$ alkynyl of $R^1$, $R^2$ and $R^3$ include linear or branched alkynyls, such as —C≡CH, —CH$_2$C≡CH, —C≡CCH$_3$, —CH$_2$CH$_2$C≡CH, —CHCH$_3$C≡CH, —CH$_2$C≡CCH$_3$, —C≡CCH$_2$CH$_3$, etc., but the present invention is not limited thereto. Also, $C_2$~$C_{20}$ fluoroalkynyl of $R^1$, $R^2$ and $R^3$ includes at least one fluorine group substituting for hydrogen of the alkynyl group as defined above.

Also, in the compound represented by Formula 1 of the present invention, alkyl, fluoroalkyl, alkenyl, fluoroalkenyl, alkynyl, and fluoroalkynyl of $R^1$ and $R^2$ are preferably $C_3$~$C_{12}$ linear or branched, more preferably $C_3$~$C_{12}$ branched.

In the compound represented by Formula 1 of the present invention, l+m+n represents an integer equal to or greater than 1, preferably an integer of 1 to 4, and more preferably an integer of 1 to 3.

Also, in the compound represented by Formula 1, [ring A]$_1$-G$^1$-[ring B]$_m$-G$^2$-[ring C]$_n$ as a mesogenic core between Y and E is preferably [aromatic ring-single bond-aromatic ring], [aromatic ring-double bond-aromatic ring], or [aromatic ring-triple bond-aromatic ring], and herein, the single bond indicates that G$^1$ and G$^2$ are —(CH$_2$)$_q$—, and q=0. More preferably, [ring A]$_1$-G$^1$-[ring B]$_m$-G$^2$-[ring C]$_n$ may be [aromatic ring-single bond-aromatic ring] or [aromatic ring-triple bond-aromatic ring].

Also, the compound represented by Formula 1 preferably has at least one structure selected from the group including [aromatic ring-single bond], [single bond-aromatic ring], [biphenyl-CN], [triple bond-aromatic ring] and [aromatic ring-triple bond].

Specific examples of the compound represented by Formula 1 are as follows, but the present invention is not limited thereto.

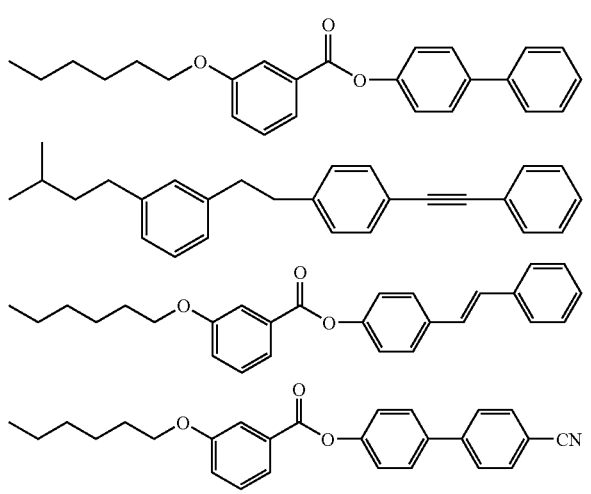

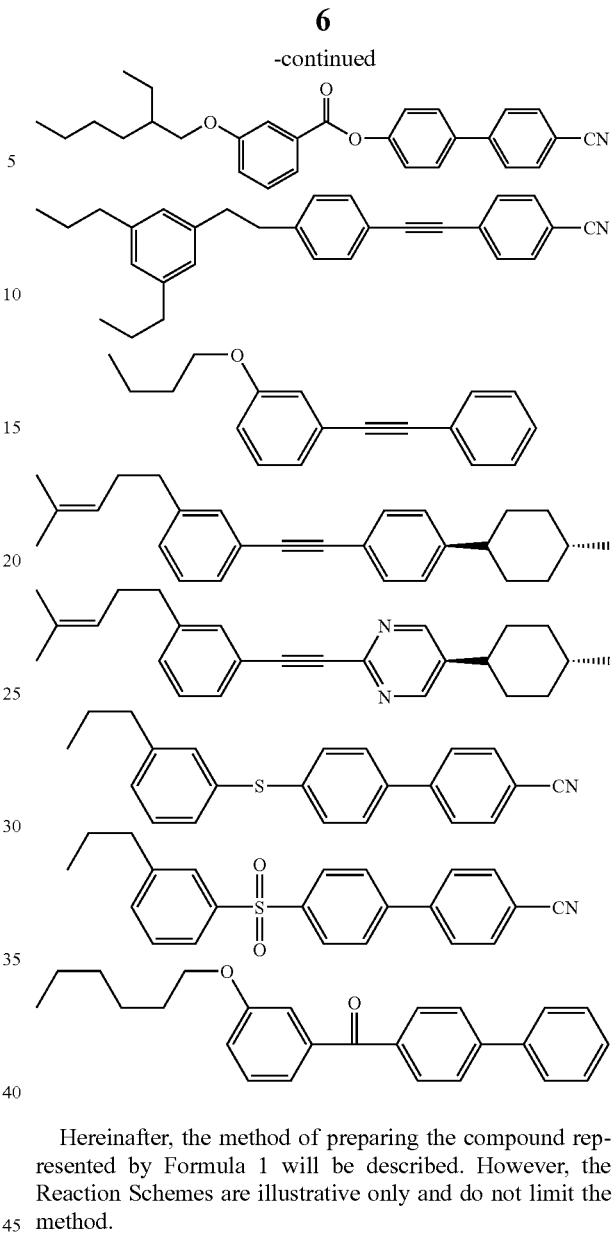

Hereinafter, the method of preparing the compound represented by Formula 1 will be described. However, the Reaction Schemes are illustrative only and do not limit the method.

The compound represented by Formula 1 may be prepared by Reaction Scheme 1.

[Reaction Scheme 1]

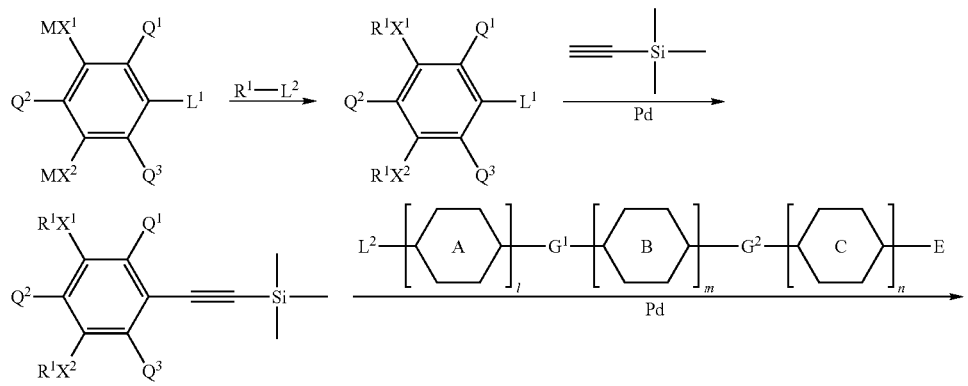

-continued

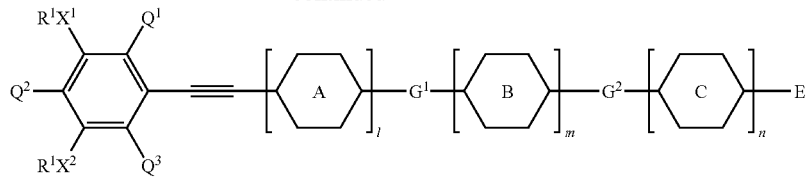

In Reaction Scheme 1, ring A, ring B, ring C, l, m, n, $G^1$, $G^2$, $R^1$, $R^2$, $Q^1$, $Q^2$, $Q^3$, $X^1$, $X^2$ and E are the same as defined in Formula 1, each of $L^1$ and $L^2$ independently represents a living group, such as halide, mesylate, tosylate, or triflate, and M is a metal, such as Li, Na, Mg, K, Ca, and Cs.

In Reaction Scheme 1, a tolane structure compound may be prepared by introducing a substituent to a meta position, etc. by a base, an alkyl halide, etc., and by carrying out a Pd coupling reaction twice. Also, a compound of a metal anion, which is a starting material, may be obtained by using BuLi, NaH, NaOH, NaHCO$_3$, Na$_2$CO$_3$, Mg, K$_2$CO$_3$, KOH, CaH, or Cs$_2$CO$_3$, etc.

Also, the compound represented by Formula 1 may be prepared by Reaction Scheme 2.

[Reaction Scheme 2]

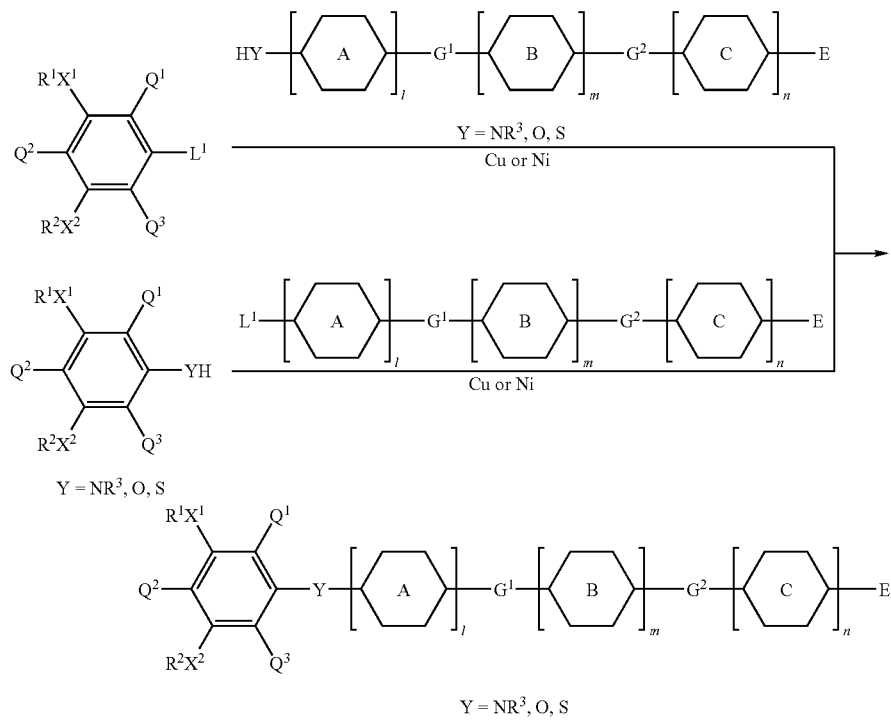

In Reaction Scheme 2, ring A, ring B, ring C, l, m, n, $G^1$, $G^2$, $R^1$, $R^2$, $Q^1$, $Q^2$, $Q^3$, $X^1$, $X^2$ and E are the same as defined in Formula 1, and $L^1$ represents a living group, such as halide, mesylate, tosylate, or triflate.

Also, the compound represented by Formula 1 may be prepared by Reaction Scheme 3.

[Reaction Scheme 3]

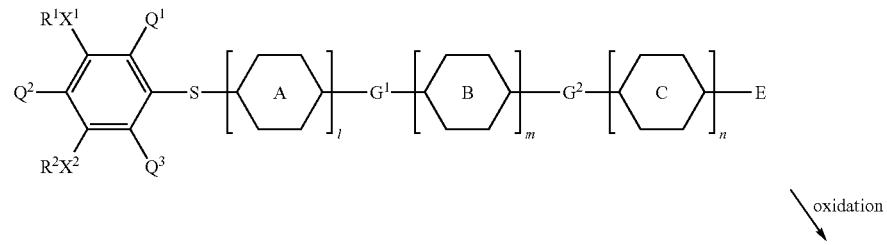

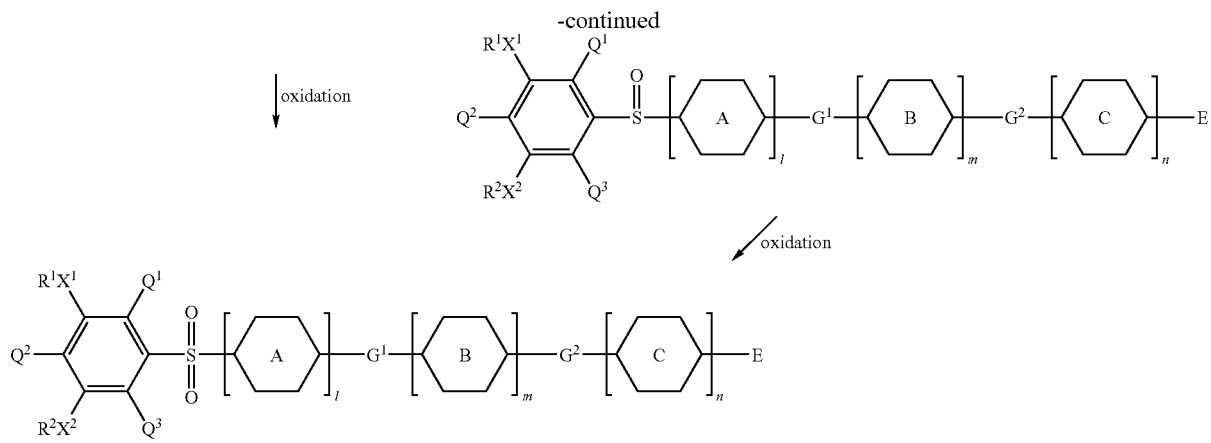

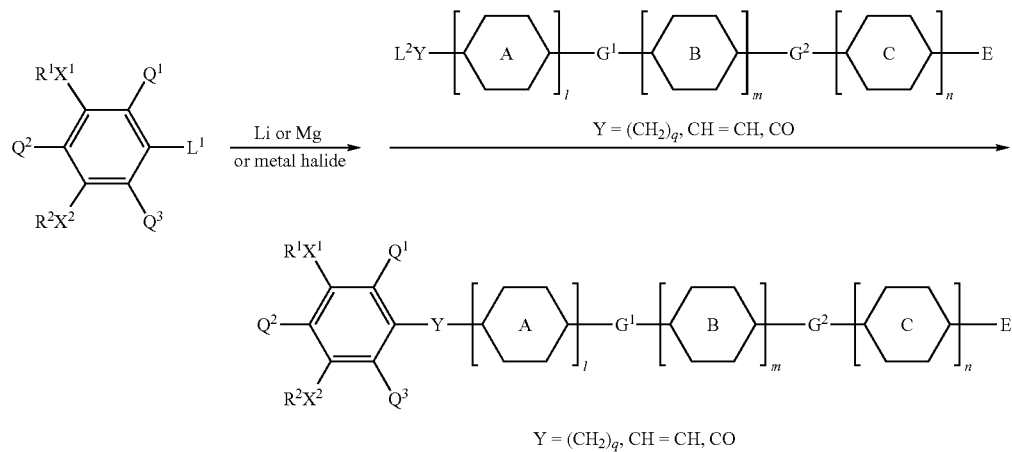

In Reaction Scheme 3, ring A, ring B, ring C, l, m, n, $G^1$, $G^2$, $R^1$, $R^2$, $Q^1$, $Q^2$, $Q^3$, $X^1$, $X^2$ and E are the same as defined in Formula 1.

In Reaction Schemes 2 and 3, an aryl substitution reaction may be used to synthesize a compound in which Y=$NR^3$, O, S, etc. and SO and $SO_2$ may be introduced through an oxidation reaction.

Also, the compound represented by Formula 1 may be prepared by Reaction Scheme 4.

In Reaction Scheme 4, ring A, ring B, ring C, l, m, n, $G^1$, $G^2$, $R^1$, $R^2$, $Q^1$, $Q^2$, $Q^3$, $X^1$, $X^2$ and E are the same as defined in Formula 1, and each of $L^1$ and $L^2$ independently represents a living group, such as halide, mesylate, tosylate, or triflate.

As described in Reaction Scheme 4, through a nucleophilic substitution reaction, a compound in which Y is $(CH_2)_q$, CH=CH, and CO may be prepared.

Also, the compound represented by Formula 1 may be prepared by Reaction Scheme 5.

[Reaction Scheme 5]

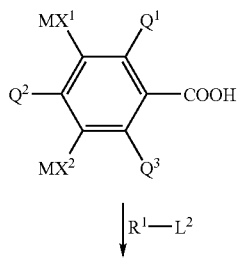

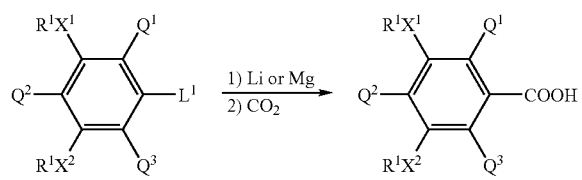
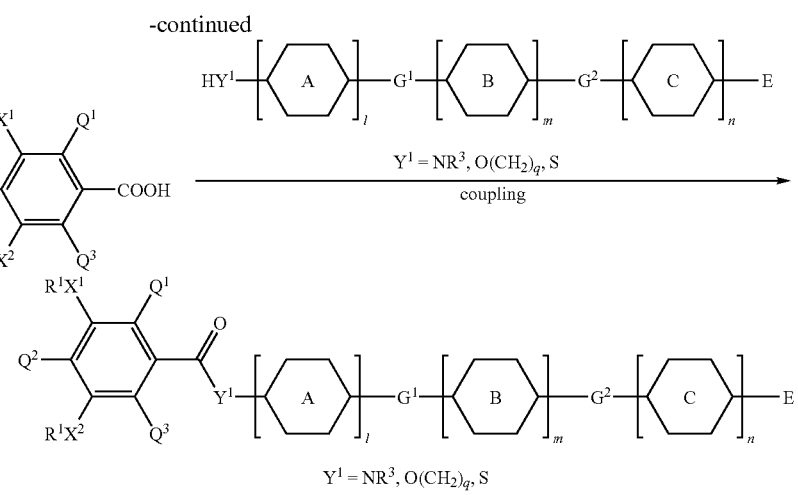

In Reaction Scheme 5, ring A, ring B, ring C, l, m, n, $G^1$, $G^2$, $R^1$, $R^2$, $Q^1$, $Q^2$, $Q^3$, $X^1$, $X^2$ and E are the same as defined in Formula 1, each of $L^1$ and $L^2$ independently represents a living group, such as halide, mesylate, tosylate, or triflate, and M is a metal, such as Li, Na, Mg, K, Ca, or Cs.

Also, the compound represented by Formula 1 may be prepared by Reaction Scheme 6.

Based on Reaction Schemes 5 and 6, a $CO_2H$ group may be prepared by bubbling $CO_2$ gas, and an OH group may be introduced by using $(Me_3SiO)_2$. Herein, $SOCl_2$, $COCl_2$, MsCl, TsCl, EDC, DCC, etc. may be used to prepare an ester compound, or Dean-Stark may be used to carry out an esterification reaction.

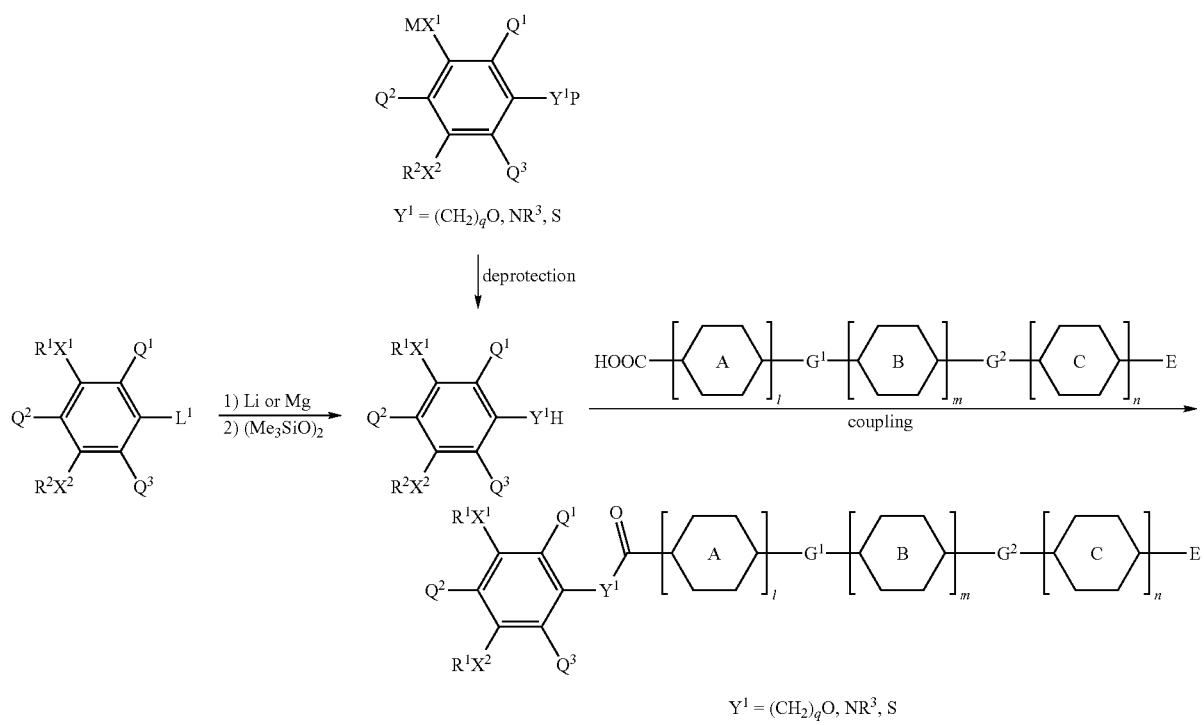

In Reaction Scheme 6, ring A, ring B, ring C, l, m, n, $G^1$, $G^2$, $R^1$, $R^2$, $Q^1$, $Q^2$, $Q^3$, $X^1$, $X^2$ and E are the same as defined in Formula 1, each of $L^1$ and $L^2$ independently represents a living group, such as halide, mesylate, tosylate, or triflate, P represents a protection group, and M is a metal, such as Li, Na, Mg, K, Ca, or Cs.

In the method of preparing the compound represented by Formula 1 according to the present invention, any reactant capable of showing the same or similar effects to that of the reactant used in Reaction Schemes 1 to 6 may be used, and any preparation method having a similar scheme to that of Reaction Schemes 1 to 6 may be employed.

A resin composition according to the present invention includes a polymer resin and a compound represented by Formula 1 of the present invention. Herein, the compound represented by Formula 1 may play a role of controlling the optical characteristic of the polymer resin.

When used for such purpose, the compound represented by Formula 1 may be used alone or in combination. Also, within the resin composition, the polymer resin and the anisotropic compound represented by Formula 1 may be used in a weight ratio of 50:50 to 99:1, preferably of 70:30 to 99:1, and more preferably of 80:20 to 99:1.

As the polymer resin, which can be mixed with the compound represented by Formula 1, a conventional polymer resin for optical use may be used with no particular limitation. Examples of the polymer resin include polyimide, polyamide imide, polyamide, polyetherimide, polyetheretherketone, polyetherketone, polyketone sulfide, polyethersulfone, cycloolefin polymer, polysulfone, polyphenylene sulfide, polyphenylene oxide, polyethylene terephthalate, polybutylene terephthalate, polyethylene naphthalate, polyacetal, polycarbonate, polyacrylate, acrylic resin, polyvinyl alcohol, polypropylene, cellulose, triacetyl cellulose, epoxy resin, phenol resin, etc., but the present invention is not limited thereto. Also, the polymer resins may be used alone or in combination, and herein, the use amount is not particularly limited.

Also, the resin composition according to the present invention may include an organic solvent as required, in addition to the polymer resin, and the anisotropic compound. The organic solvent included in the composition facilitates the application (coating) of the resin composition of the present invention on a substrate.

Herein, as the organic solvent, conventional organic solvents known in the art may be used without any particular limitation. Non-limiting examples of the organic solvent include: hydrocarbons such as cyclohexane, cyclopentane, benzene, toluene, xylene, butylbenzene, etc.; ketones such as acetone, methyl ethyl ketone, methyl isobutyl ketone, cyclohexanone, etc.; esters such as ethyl acetate, ethylene glycol monomethyl ether acetate, propylene glycol monomethyl ether acetate, gamma-butyrolactone, etc.; amides such as 2-pyrrolidone, N-methyl-2-pyrrolidone, dimethylformamide, dimethylacetamide, etc.; halogens such as chloroform, dichloromethane, carbon tetrachloride, dichloroethane, tetrachloroethane, tetrachloroethylene, chlorobenzene, etc.; alcohols such as t-butyl alcohol, diacetone alcohol, glycerin, monoacetin, ethylene glycol, triethylene glycol, hexylene glycol, ethylene glycol monomethyl ether, etc.; phenols such as phenol, parachlorophenol, etc.; and ethers such as methoxybenzene, 1,2-dimethoxybenzene, diethylene glycol dimethyl ether, ethylene glycol dimethyl ether, ethylene glycol diethyl ether, propylene glycol dimethyl ether, propylene glycol diethyl ether, diethylene glycol dimethyl ether, diethylene glycol diethyl ether, dipropylene glycol dimethyl ether, dipropylene glycol diethyl ether, etc. Also, the organic solvents may be used alone or in combination, and herein, the use amount is not particularly limited.

Also, the resin composition of the present invention may include a surfactant as required. A surfactant may be used to allow the composition to be easily applied on a substrate. As the surfactant, conventional surfactants known in the art may be used without any particular limitation, and the addition amount may vary according to the kind of surfactant, the composition ratio of components of a mixture, the kind of solvent, and the kind of substrate.

Also, the resin composition of the present invention may include a stress reducing agent, a leveling agent, etc. as an additional additive.

An optical member according to the present invention includes the resin composition of the present invention.

Herein, when a film-type optical member is obtained by using the resin composition of the present invention, the resin solids including the compound represented by Formula 1 are usually included in an amount of 0.1 to 90 wt %, preferably of 1 to 50 wt %, and more preferably of 5 to 40 wt %, based on the total resin composition including a solvent. If the concentration of the resin composition is less than the lower limit, it is difficult to secure the thickness of a film, and if the concentration is greater than the upper limit, it is difficult to obtain a film having a uniform thickness due to high viscosity of a solution.

Also, the film obtained by using the resin composition of the present invention may be a uniaxially oriented film or a biaxially oriented film, and the polymer film may be used after surface treatment such as hydrophilic treatment or hydrophobic treatment, and may be a laminated film or glass.

Also, the film may be made into a transparent film by using the resin composition of the present invention, and a melt-molding method or a solvent cast method, etc. In manufacturing the transparent film by the solvent cast method, the resin composition is applied on a support, such as a metal drum, a still belt, a polyester film, Teflon, etc., a solvent is dried in a drying furnace by using a roller, and then a film is peeled from the support. The amount of residual solvent in the transparent film is usually 10 wt % or less, preferably 5 wt % or less, and more preferably 1 wt % or less. If the amount of residual solvent is greater than the upper limit, the heat resistance of the film shows a tendency to be decreased. The manufactured transparent film may control the optical characteristic of the polymer resin by uniaxial orienting or biaxial orienting.

Reference will now be made in detail to the preferred embodiments of the present invention. However, the following examples are illustrative only, and the scope of the present invention is not limited thereto.

Example 1

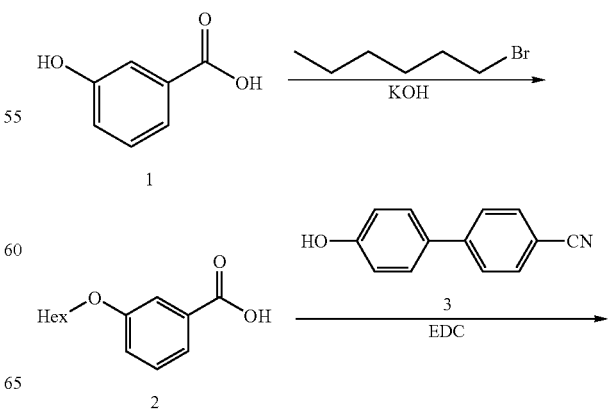

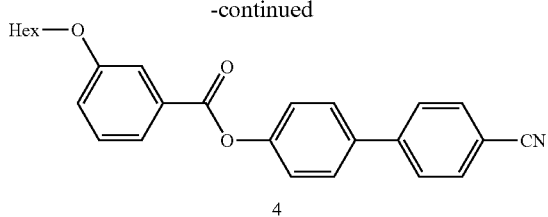

1.0 equivalent of a compound 1 was dissolved in a mixed solvent (ethanol:water=7:3), and 1.0 equivalent of 1-bromohexane and 2.2 equivalents of KOH were added, and the reactant mixture was stirred at 90□ for 10 hours. Then, ethanol was completely removed by distillation under reduced pressure, and water was additionally added. 10% HCl (aq) was gradually added thereto to adjust pH to 1 to 3 and then to obtain a compound 2 at a yield of 90% or more.

1.0 equivalent of a compound 2 and 1.0 equivalent of a compound 3 were dissolved in $CH_2Cl_2$. Then, 1.2 equivalents of EDC and 0.1 equivalents of DMAP were added thereto, and stirred at room temperature for 10 hours. Then, the mixture was worked up with $CH_2Cl_2$ and purified via silica gel to obtain a final compound 4 at a yield of 88% or more. $^1$HNMR of the compound 4 is as follows.

$^1$HNMR (400 MHz, $CDCl_3$): δ 0.93 (t, 3H), 1.29~1.45 (m, 4H), 1.46~1.57 (m, 2H), 1.78~1.89 (m, 2H), 4.05 (t, 2H), 7.20 (dd, 1H), 7.35 (d, 2H), 7.43 (t, 1H), 7.67 (d, 2H), 7.69~7.80 (m, 5H), 7.83 (d, 1H).

Example 2

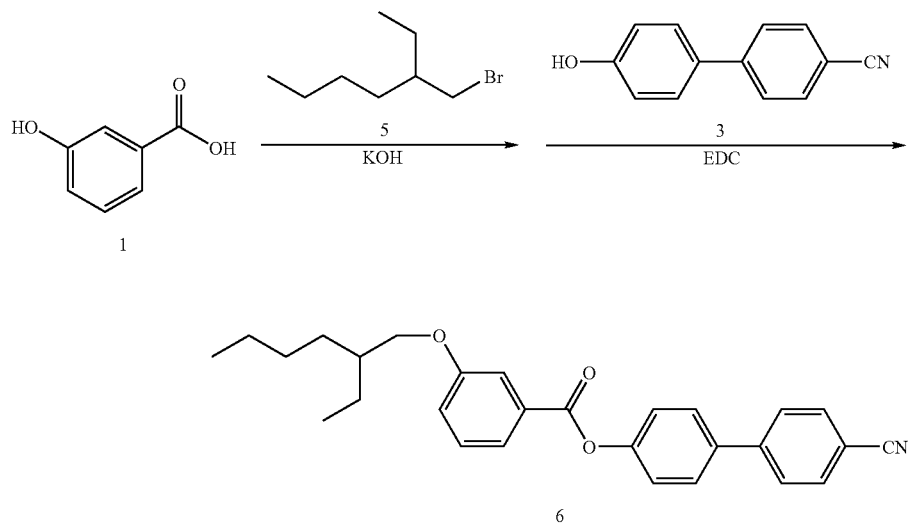

1.0 equivalent of a compound 1 was dissolved in a mixed solvent (ethanol:water=7:3), and 1.0 equivalent of 2-ethylhexyl-1-bromide (5) and 2.2 equivalents of KOH were added, and the reactant mixture was stirred at 90□ for 10 hours. Then, ethanol was completely removed by distillation under reduced pressure, and water was additionally added. 10% HCl(aq) was gradually added thereto to adjust pH to 1 to 3 and then to obtain alkoxybenzoic acid at a yield of 90% or more.

1.0 equivalent of the benzoic acid compound and 1.0 equivalent of a compound 3 were dissolved in $CH_2Cl_2$. Then, 1.2 equivalents of EDC and 0.1 equivalents of DMAP were added thereto, and stirred at room temperature for 10 hours. Then, the mixture was worked up with $CH_2Cl_2$ and purified via silica gel to obtain a final compound 6 at a yield of 85% or more. $^1$H NMR of the compound 6 is as follows.

$^1$HNMR (400 MHz, $CDCl_3$): δ 0.90~0.97 (m, 6H), 1.29~1.38 (m, 4H), 1.38~1.61 (m, 4H), 1.69~1.81 (m, 1H), 3.94 (dd, 2H), 7.21 (dd, 1H), 7.34 (d, 2H), 7.42 (t, 1H), 7.66 (d, 2H), 7.68~7.78 (m, 5H), 7.80 (d, 1H).

Example 3

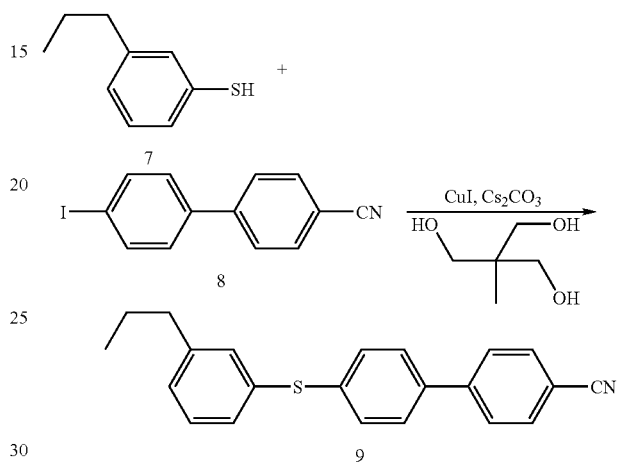

1.0 equivalent of a compound 7 and 1.0 equivalent of a compound 8 were dissolved in a mixed solvent (Dioxane:DMF=9:1), and 2.0 equivalents of $Cs_2CO_3$, 0.1 equivalents of CuI, and 0.1 equivalents of 1,1,1-tris(hydroxymethyl)ethane were added, and the reactant mixture was stirred at 110□ for 20 hours. Then, the mixture was worked up with ether and water and purified via silica gel to obtain a compound 9 at a yield of 90%. $^1$HNMR of the compound 9 is as follows.

$^1$HNMR (400 MHz, $CDCl_3$): δ 0.93 (t, 3H), 1.48~1.63 (m, 2H), 2.30 (t, 3H), 7.02~7.53 (m, 6H), 7.65 (d, 2H), 7.69~7.74 (m, 4H).

Example 4

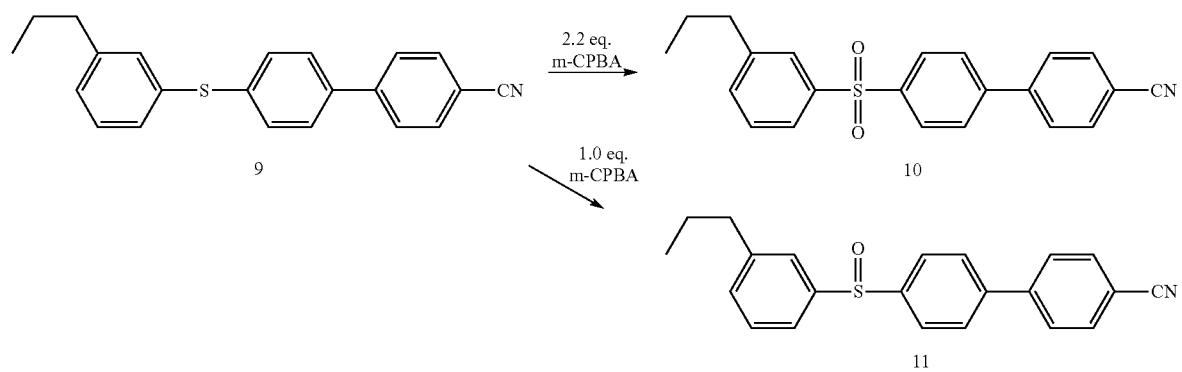

1.0 equivalent of a compound 9 was dissolved in a CH$_2$Cl$_2$ solvent, and 2.2 equivalents of m-CPBA (m-chloroperbenzoic acid) was gradually added at 0□, and the reactant mixture was stirred at room temperature for 30 minutes. Then, the mixture was worked up, and purified via silica gel to obtain a compound 10 at a yield of 80%. Herein, when 1.0 equivalent of m-CPBA, instead of 2.2 equivalents of m-CPBA, is used, a sulfoxide compound 11 may be obtained. $^1$HNMR of the compound 10 is as follows.

$^1$HNMR (400 MHz, CDCl$_3$): δ 0.93 (t, 3H), 1.48~1.63 (m, 2H), 2.30 (t, 3H), 7.18~7.22 (m, 2H), 7.63 (d, 2H), 7.65~7.70 (m, 4H), 7.99~8.05 (m, 4H).

Example 5

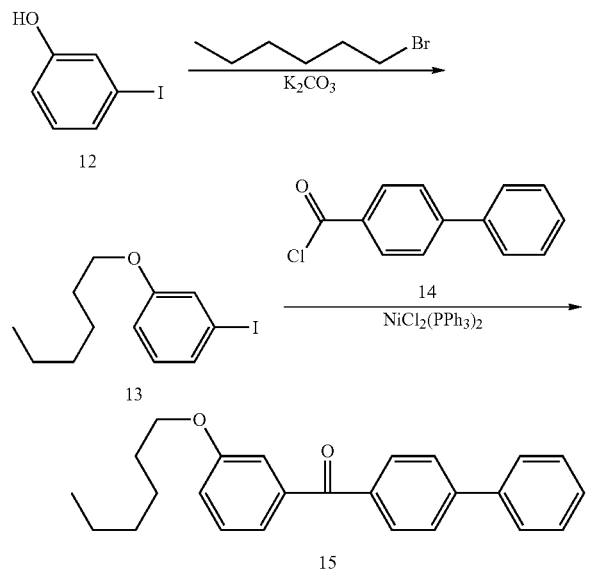

1.0 equivalent of a compound 12 was dissolved in butanone, and 1.2 equivalents of hexylbromide and 1.2 equivalents of K$_2$CO$_3$ were added, and the reactant mixture was stirred at 80□ for 5 hours. Then, the mixture was worked up with ether, and purified via silica gel to obtain a compound 13 at a yield of 90% or more. A compound 14 was prepared by using an acid compound (such as a compound 19), SOCl$_2$ and TEA in a conventional manner.

1.0 equivalent of a compound 13 and 1.0 equivalent of a compound 14 were dissolved in an anhydrous benzene solvent, and NiCl$_2$(PPh$_3$)$_2$ was added as a catalyst, and the reactant mixture was stirred at room temperature for 2 hours. Then, the mixture was worked up with water and ether, and purified via silica gel column chromatography to obtain a final compound 15 at a yield of about 70%. $^1$HNMR of the compound 15 is as follows.

$^1$HNMR (400 MHz, CDCl$_3$): δ 0.98 (t, 3H), 1.30~1.45 (m, 4H), 1.45~1.59 (m, 2H), 1.80~1.89 (m, 2H), 4.05 (t, 2H), 7.21~7.60 (m, 9H), 7.87 (s, 1H), 7.92 (m, 3H).

Example 6

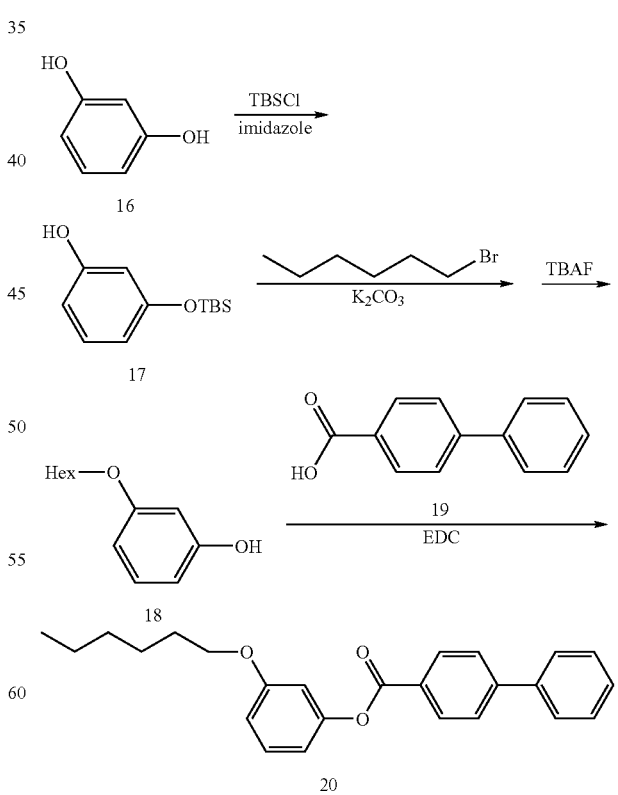

1.0 equivalent of a compound 16 was dissolved in THF, and 1.0 equivalent of tert-butyldimethylsilyl chloride and 1.2 equivalents of imidazole were added, and the reactant mixture was stirred at 80° C. for 5 hours. Then, the generated salt was filtered off, and the filtrated solution was purified via silica gel to obtain a compound 17 at a yield of 80%.

A compound 17 was dissolved in butanone, and 1.2 equivalents of hexylbromide and 1.2 equivalents of $K_2CO_3$ were added, and the reactant mixture was stirred at 80□ for 10 hours. Then, the mixture was worked up with ether, and purified via silica gel. The purified product was dissolved in THF, and 1.1 equivalents of TBAF was added thereto to carry out deprotection. After the mixture was stirred at room temperature for about 1 hour, the mixture was worked up with ether, and purified via silica gel to obtain a compound 18.

1.0 equivalent of a compound 18 and 1.0 equivalent of a compound 19 were dissolved in $CH_2Cl_2$, and 1.2 equivalents of EDC and 0.1 equivalents of DMAP were added, and the reactant mixture was stirred at room temperature for 10 hours. Then, the mixture was worked up with $CH_2Cl_2$, and purified via silica gel to obtain a compound 20 at a yield of about 85%. $^1$HNMR of the compound 20 is as follows.

$^1$HNMR (400 MHz, $CDCl_3$): δ 0.97 (t, 3H), 1.29~1.44 (m, 4H), 1.45~1.57 (m, 2H), 1.78~1.89 (m, 2H), 4.03 (t, 2H), 7.22~7.56 (m, 9H), 7.60 (d, 1H), 7.88 (d, 1H), 8.11 (d, 2H).

Example 7

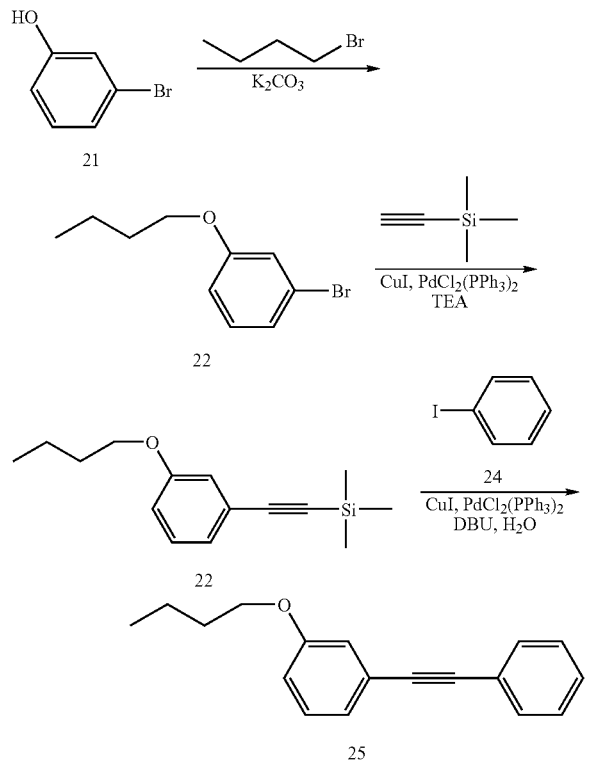

1.0 equivalent of m-bromophenol 21 was dissolved in butanone, and 1.2 equivalents of bromobutane and 1.2 equivalents of $K_2CO_3$ were added, and the reactant mixture was stirred at 80□ for 5 hours. Then, the mixture was worked up with ether and water, and purified via silica gel to obtain a compound 22 at a yield of about 95%.

1.0 equivalent of a compound 22, 1.0 equivalent of trimethylsilylacetylene, 0.1 equivalents of CuI, 0.03 equivalents of $PdCl_2(PPh_3)_2$, and 4.0 equivalents of triethylamine were dissolved in benzene, and were stirred at 60□ for 10 hours. Then, the mixture was worked up with ether and water, and purified via silica gel to obtain a compound 23 at a yield of about 90%.

1.0 equivalent of a compound 23, 1.0 equivalent of a compound 24, 0.1 equivalents of CuI, 0.03 equivalents of $PdCl_2(PPh_3)_2$, 6.0 equivalents of DBU, and 1.0 equivalent of $H_2O$ were dissolved in benzene, and were stirred at 60□ for 10 hours. Then, the mixture was worked up with ether and water, and purified via silica gel to obtain a final compound 25 at a yield of about 85%. $^1$HNMR of the compound 25 is as follows.

$^1$HNMR (400 MHz, $CDCl_3$): δ 1.06 (t, 3H), 1.73~1.92 (m, 4H), 4.07 (t, 2H), 7.17 (d, 1H), 7.22 (d, 1H), 7.25~7.30 (m, 3H), 7.47 (m, 3H), 7.68 (s, 1H).

Example 8

Compatibility Test 90 parts by weight of general-purpose acrylate polymer resin (Mw=100,000), and 10 parts by weight of the compound synthesized in Example 1 were dissolved in 400 parts by weight of ethyl acetate (concentration=20 wt %), and the resultant solution was applied on glass and baked at 110□ for 3 minutes. After storage of the resultant product at room temperature for 24 hours, whether solid was precipitated on the surface or not was observed by an optical microscope or naked eyes. FIG. 1 shows the result. According to the compatibility test result, an anisotropic compound was not precipitated even after 24 hours.

Example 9

Compatibility Test

Figure 2:
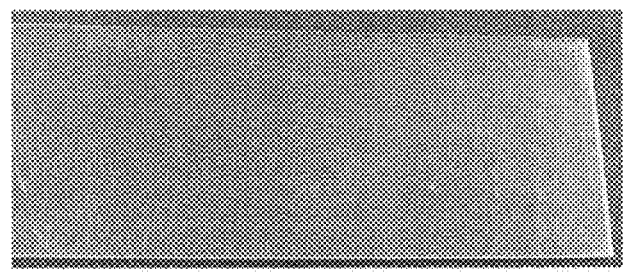
FIGS. 2 to 7 are optical microscopic photographs showing the results of the compatibility tests according to Examples 9 to 14.

A compatibility test was carried out in the same manner as described in Example 8, except that the compound synthesized in Example 2, instead of the compound synthesized in Example 1, was used in an amount of 20 parts by weight. FIG. 2 shows the result. According to the compatibility test result, an anisotropic compound was not precipitated, even after 24 hours.

Example 10

Compatibility Test

Figure 3:
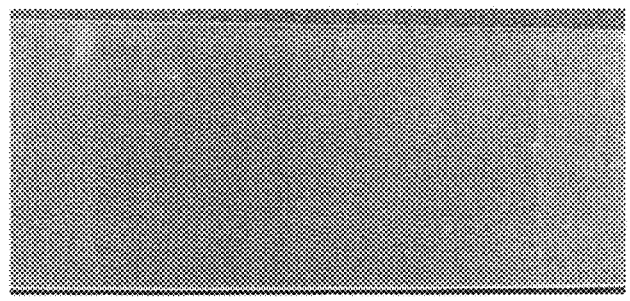

A compatibility test was carried out in the same manner as described in Example 8, except that the compound synthesized in Example 3, instead of the compound synthesized in Example 1, was used in an amount of 10 parts by weight. FIG. 3 shows the result. According to the compatibility test result, an anisotropic compound was not precipitated, even after 24 hours.

Example 11

Compatibility Test

Figure 4:
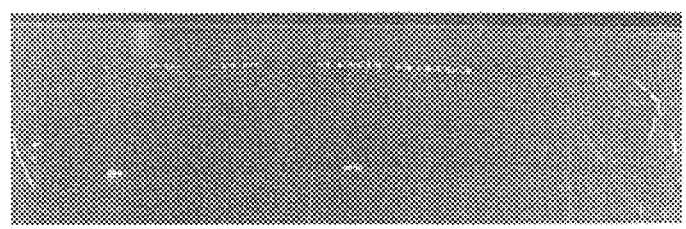

A compatibility test was carried out in the same manner as described in Example 8, except that the compound synthesized in Example 4, instead of the compound synthesized in Example 1, was used in an amount of 10 parts by weight. FIG. 4 shows the result. According to the compatibility test result, an anisotropic compound was not precipitated, even after 24 hours.

Example 12

Compatibility Test

Figure 5:
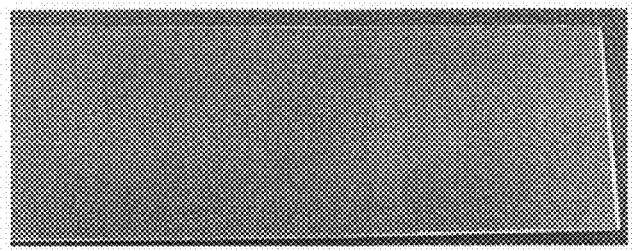

A compatibility test was carried out in the same manner as described in Example 8, except that the compound synthesized in Example 5, instead of the compound synthesized in Example 1, was used in an amount of 10 parts by weight. FIG. 5 shows the result. According to the compatibility test result, an anisotropic compound was not precipitated, even after 24 hours.

Example 13

Compatibility Test

Figure 6:
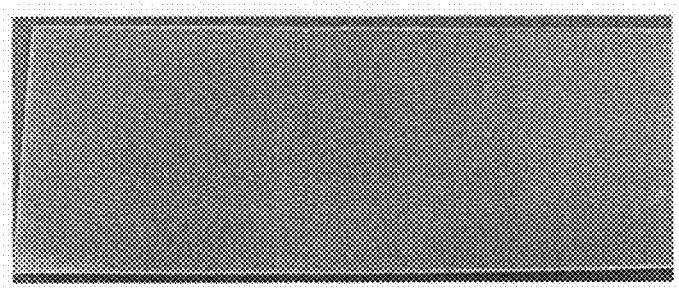

A compatibility test was carried out in the same manner as described in Example 8, except that the compound synthesized in Example 6, instead of the compound synthesized in Example 1, was used in an amount of 10 parts by weight. FIG. 6 shows the result. According to the compatibility test result, an anisotropic compound was not precipitated, even after 24 hours.

Example 14

Compatibility Test

Figure 7:

A compatibility test was carried out in the same manner as described in Example 8, except that the compound synthesized in Example 7, instead of the compound synthesized in Example 1, was used in an amount of 10 parts by weight. FIG. 7 shows the result. According to the compatibility test result, an anisotropic compound was not precipitated, even after 24 hours.

Comparative Example 1

Compatibility Test

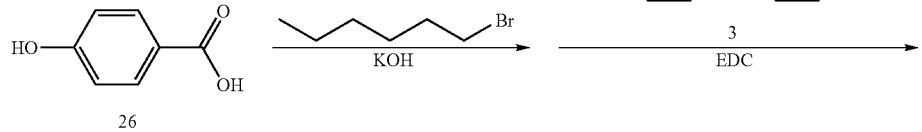

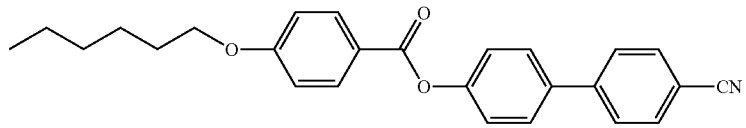

Figure 8:
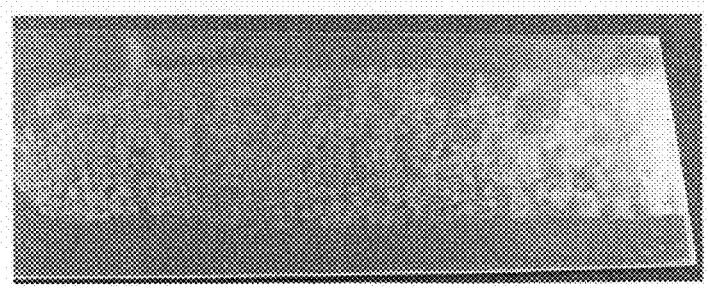
FIGS. 8 and 9 are a photograph and an optical microscopic photograph (×5) showing the result of the compatibility test according to Comparative Example 1.
Figure 9:
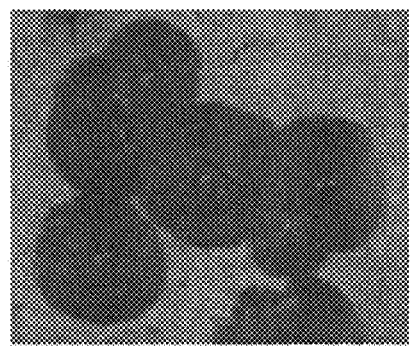

A compatibility test was carried out in the same manner as described in Example 8, except that instead of the compound synthesized in Example 1, a compound 27 synthesized by a similar reaction to Example 1 was used in an amount of 10 parts by weight. FIGS. 8 and 9 show the result. According to the compatibility test result, after the manufacture of a film, precipitation of the compound 27 on the surface of the film was observed at room temperature.

Comparative Example 2

Compatibility Test

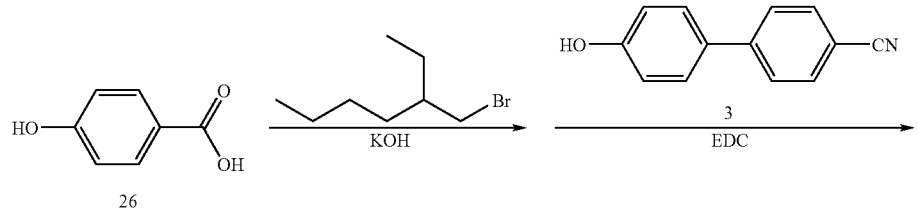

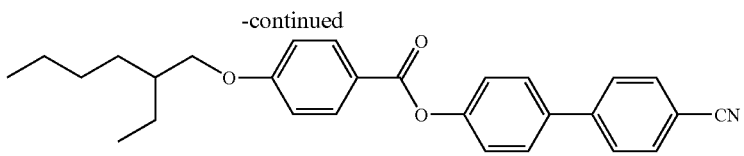

28

Figure 10:
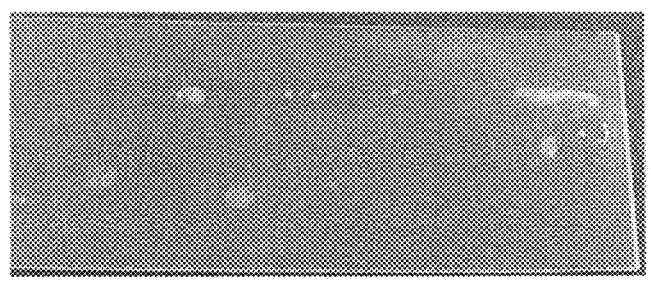
FIG. 10 is a photograph showing the result of the compatibility test according to Comparative Example 2.

A compatibility test was carried out in the same manner as described in Example 8, except that instead of the compound synthesized in Example 2, a compound 28 synthesized by a similar reaction to Example 2 was used in an amount of 10 parts by weight. FIG. 10 shows the result. According to the compatibility test result, after the manufacture of a film, precipitation of the compound 28 on the surface of the film was observed at room temperature.

Based on the above mentioned results, it was determined that anisotropic compounds (the compound represented by Formula 1) having a meta substituent in the present invention have high compatibility with a polymer resin, and especially, in the case where a branched substituent is introduced at a meta position, higher compatibility was shown.

The invention claimed is:

1. A compound represented by Formula 1:

[Formula 1]

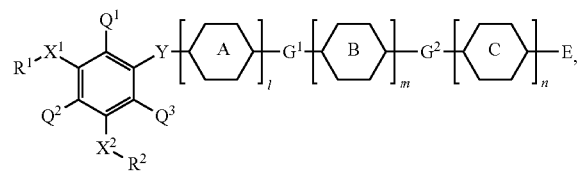

wherein

represents

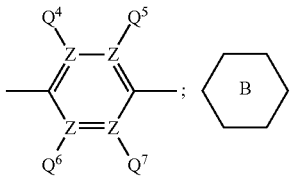

represents

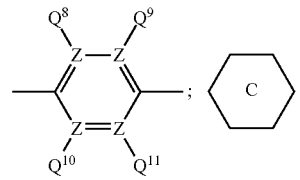

represents

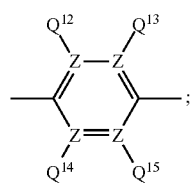

each of $Q^1$ to $Q^{15}$ represents —H;

Z represents C;

each of l, m and n independently represents an integer of 0 to 2, and l+m+n is an integer equal to or more than 2;

Y represents —SO—, —C≡C—, —C(=O)O(CH$_2$)$_q$—, —OC(=O)(CH$_2$)$_q$—, —(CH$_2$)$_q$C(=O)O—, —(CH$_2$)$_q$OC(=O)—, —C(=O)(CH$_2$)$_q$—, or —(CH$_2$)$_q$C(=O)—, and q is an integer of 0 to 5;

$G^1$ is a direct bond;

$G^2$ is a direct bond;

E represents —H or —CN;

each of $X^1$ and $X^2$ independently represents —O— or —(CH$_2$)$_p$—, and p represents an integer of 0 to 2;

each of $R^1$ and $R^2$ represents —H, $C_3$-$C_{12}$ branched alkyl, or $C_3$-$C_{12}$ branched alkenyl;

at least one of $X^1$—$R^1$ and $X^2$—$R^2$ is not —(CH$_2$)$_p$—H, in which p is 0; and at least one of $R^1$ and $R^2$ is $C_3$-$C_{12}$ branched alkyl or $C_3$-$C_{12}$ branched alkenyl.

2. The compound as claimed in claim 1, wherein the l+m+n is an integer of 2 or 3.

3. The compound as claimed in claim 1, wherein refractive anisotropy is 0.2 or more.

4. The compound as claimed in claim 1, which is prepared by Reaction Scheme 1:

[Reaction Scheme 1]

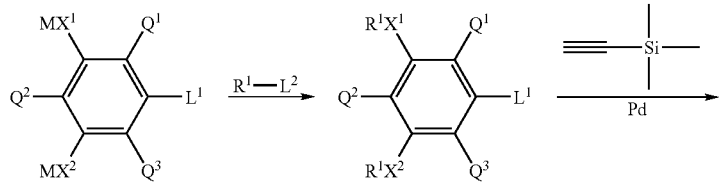

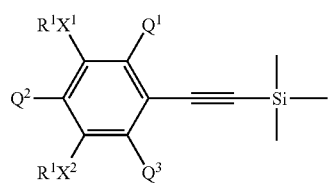
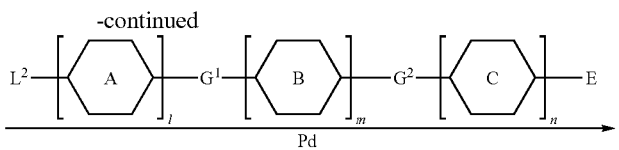

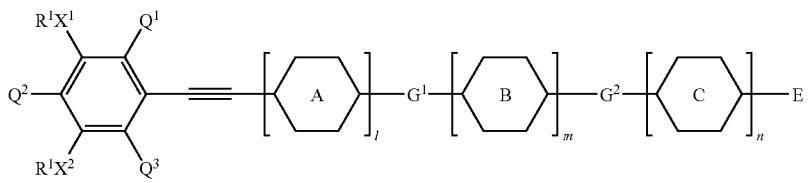

wherein ring A, ring B, ring C, l, m, n, $G^1$, $G^2$, $R^1$, $R^2$, $Q^1$, $Q^2$, $Q^3$, $X^1$, $X^2$ and E are same as defined in claim 1, each of $L^1$ and $L^2$ independently represents halide, mesylate, tosylate, or triflate, and M represents Li, Na, Mg, K, Ca, or Cs.

5. The compound as claimed in claim 1, which is prepared by Reaction Scheme 3:

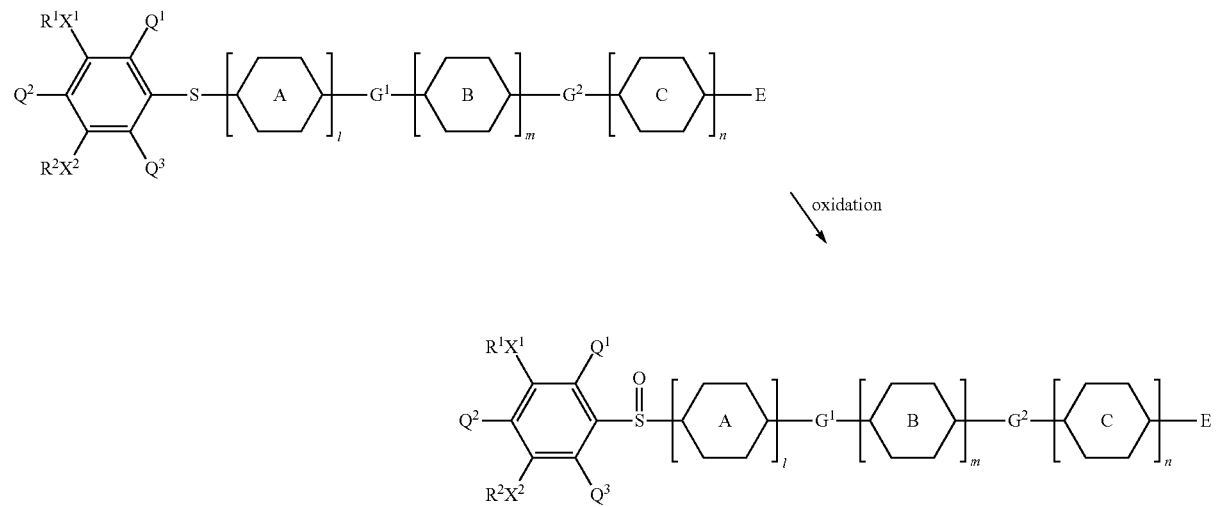

wherein ring A, ring B, ring C, l, m, n, $G^1$, $G^2$, $R^1$, $R^2$, $Q^1$, $Q^2$, $Q^3$, $X^1$, $X^2$ and E are same as defined in claim 1.

6. The compound as claimed in claim 1, which is prepared by Reaction Scheme 4:

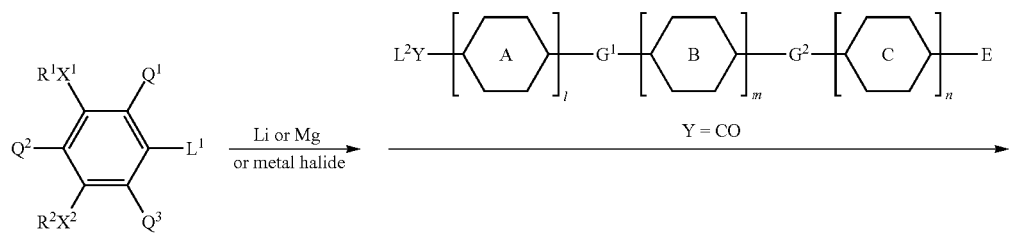

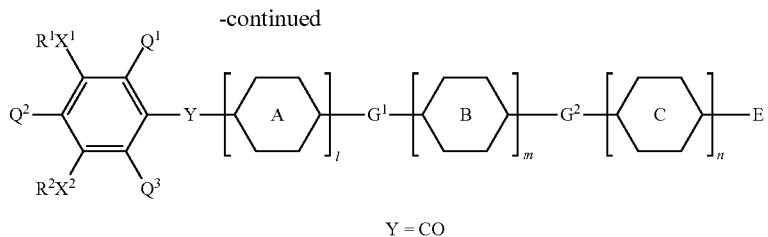

Y = CO wherein ring A, ring B, ring C, l, m, n, $G^1$, $G^2$, $R^1$, $R^2$, $Q^1$, $Q^2$, $Q^3$, $X^1$, $X^2$ and E are same as defined in claim 1, and each of $L^1$ and $L^2$ independently represents halide, mesylate, tosylate, or triflate.

7. The compound as claimed in claim 1, which is prepared by steps comprising:

preparing

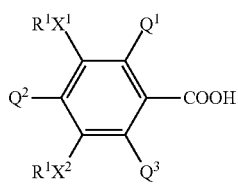

by (1) reacting

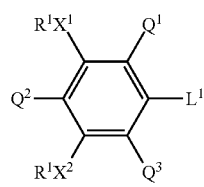

with $CO_2$ and Li or Mg, and/or (2) reacting

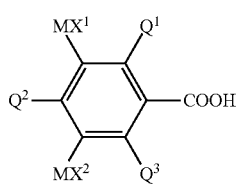

with $R^1$-$L^2$;

coupling

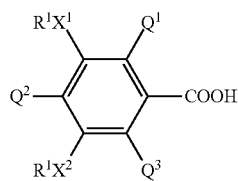

with

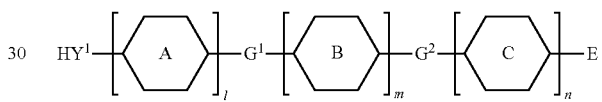

to obtain, wherein ring A, ring B, ring C, l, m, n, q, $G^1$, $G^2$, $R^1$, $R^2$, $R^3$, $Q^1$, $Q^2$, $Q^3$, $X^1$, $X^2$ and E are same as defined in claim 1, each of $L^1$ and $L^2$ independently represents halide, mesylate, tosylate, or triflate, M represents Li, Na, Mg, K, Ca, or Cs, and $Y^1$ represents $O(CH_2)_q$

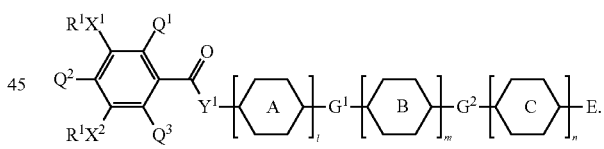

8. The compound as claimed in claim 1, which is prepared by Reaction Scheme 6:

[Reaction Scheme 6]

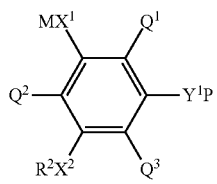

$Y^1 = (CH_2)_q O$

↓ deprotection

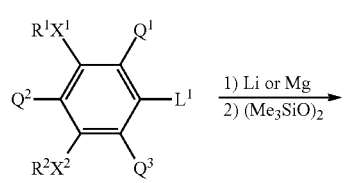 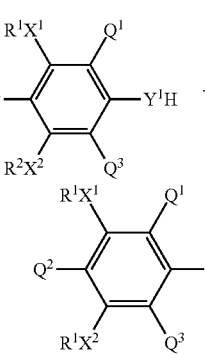

-continued

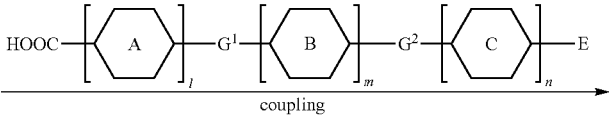

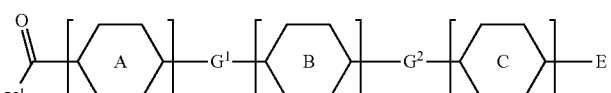

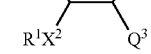

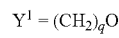

$Y^1 = (CH_2)_qO$ wherein ring A, ring B, ring C, l, m, n, q, $G^1$, $G^2$, $R^1$, $R^2$, $Q^1$, $Q^2$, $Q^3$, $X^1$, $X^2$ and E are same as defined in claim 1, each of $L^1$ and $L^2$ independently represents halide, mesylate, tosylate, or triflate, P represents a protection group, and M represents Li, Na, Mg, K, Ca, or Cs.

9. A resin composition comprising a polymer resin; and the compound represented by Formula 1 as claimed in claim 1:

[Formula 1]

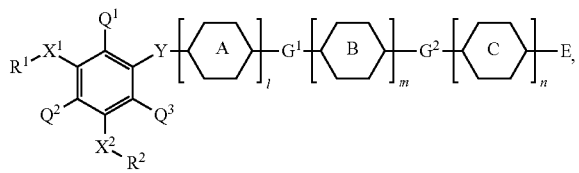

wherein

 represents

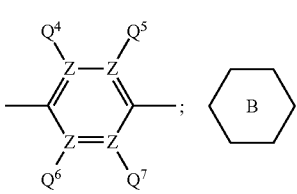

represents

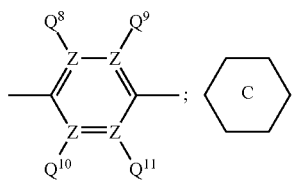; 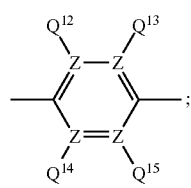

represents each of $Q^1$ to $Q^{15}$ represents —H;
Z represents C;
each of l, m and n independently represents an integer of 0 to 2, and l+m+n is an integer equal to or more than 2;
Y represents —SO—, —C≡C—, —C(=O)O(CH$_2)_q$—, —OC(=O)(CH$_2)_q$—, —(CH$_2)_q$C(=O)O—, —(CH$_2)_q$OC(=O)—, —C(=O)(CH$_2)_q$—, or —(CH$_2)_q$C(=O)—, and q is an integer of 0 to 5;
$G^1$ is a direct bond;
$G^2$ is a direct bond;
E represents —H or —CN;
each of $X^1$ and $X^2$ independently represents —O— or —(CH$_2)_p$—, and p represents an integer of 0 to 2;
each of $R^1$ and $R^2$ represents —H, $C_3$-$C_{12}$ branched alkyl, or $C_3$-$C_{12}$ branched alkenyl;
at least one of $X^1$—$R^1$ and $X^2$—$R^2$ is not —(CH$_2)_p$—H, in which p is 0; and
at least one of $R^1$ and $R^2$ is $C_3$-$C_{12}$ branched alkyl or $C_3$-$C_{12}$ branched alkenyl.

10. The resin composition as claimed in claim 9, wherein weight ratio of the polymer resin: the compound represented by Formula 1 is 50:50 to 99:1.

11. An optical member comprising the resin composition as claimed in claim 9.

12. The resin composition as claimed in claim 9, wherein the compound is prepared by Reaction Scheme 1:

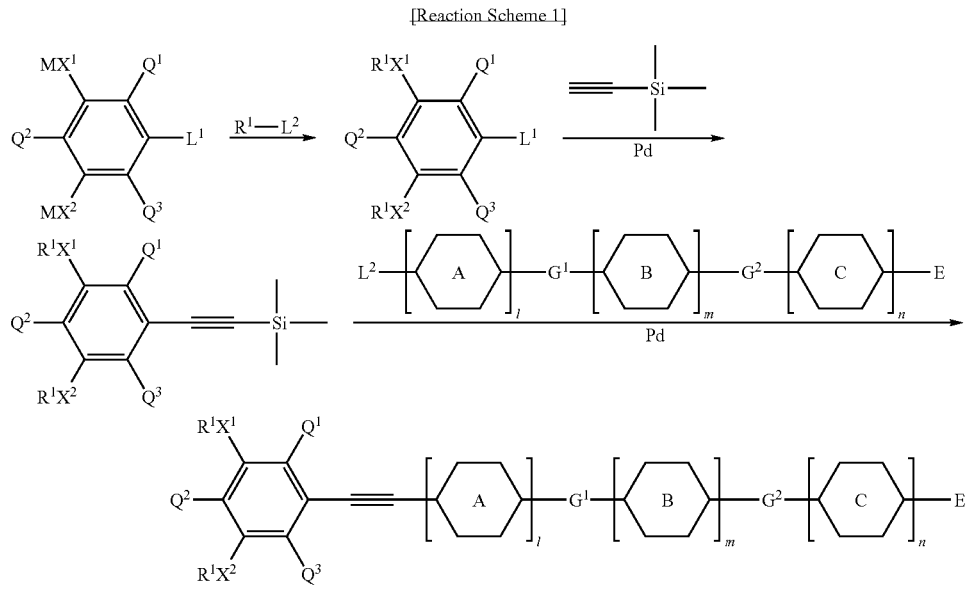

wherein ring A, ring B, ring C, l, m, n, $G^1$, $G^2$, $R^1$, $R^2$, $Q^1$, $Q^2$, $Q^3$, $X^1$, $X^2$ and E are same as defined in claim 9, each of $L^1$ and $L^2$ independently represents halide, mesylate, tosylate, or triflate, and M represents Li, Na, Mg, K, Ca, or Cs.

13. The resin composition as claimed in claim 9, wherein the compound is prepared by Reaction Scheme 2:

wherein ring A, ring B, ring C, l, m, n, $G^1$, $G^2$, $R^1$, $R^2$, $Q^1$, $Q^2$, $Q^3$, $X^1$, $X^2$ and E are same as defined in claim 9, and $L^1$ represents halide, mesylate, tosylate, or triflate.

14. The resin composition as claimed in claim 9, wherein the compound is prepared by Reaction Scheme 3:

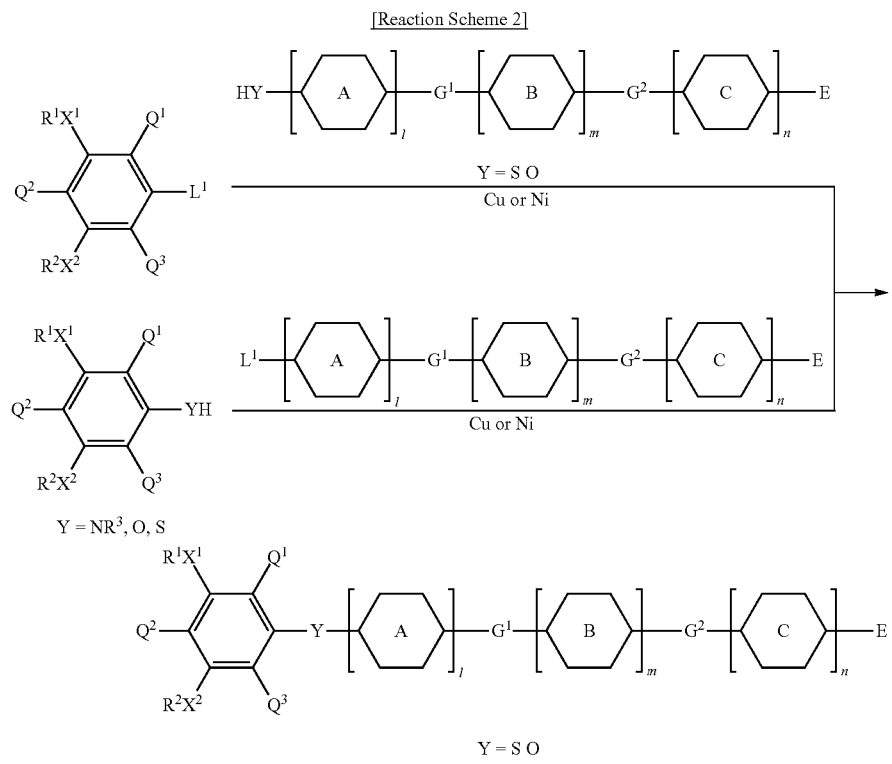

[Reaction Scheme 3]
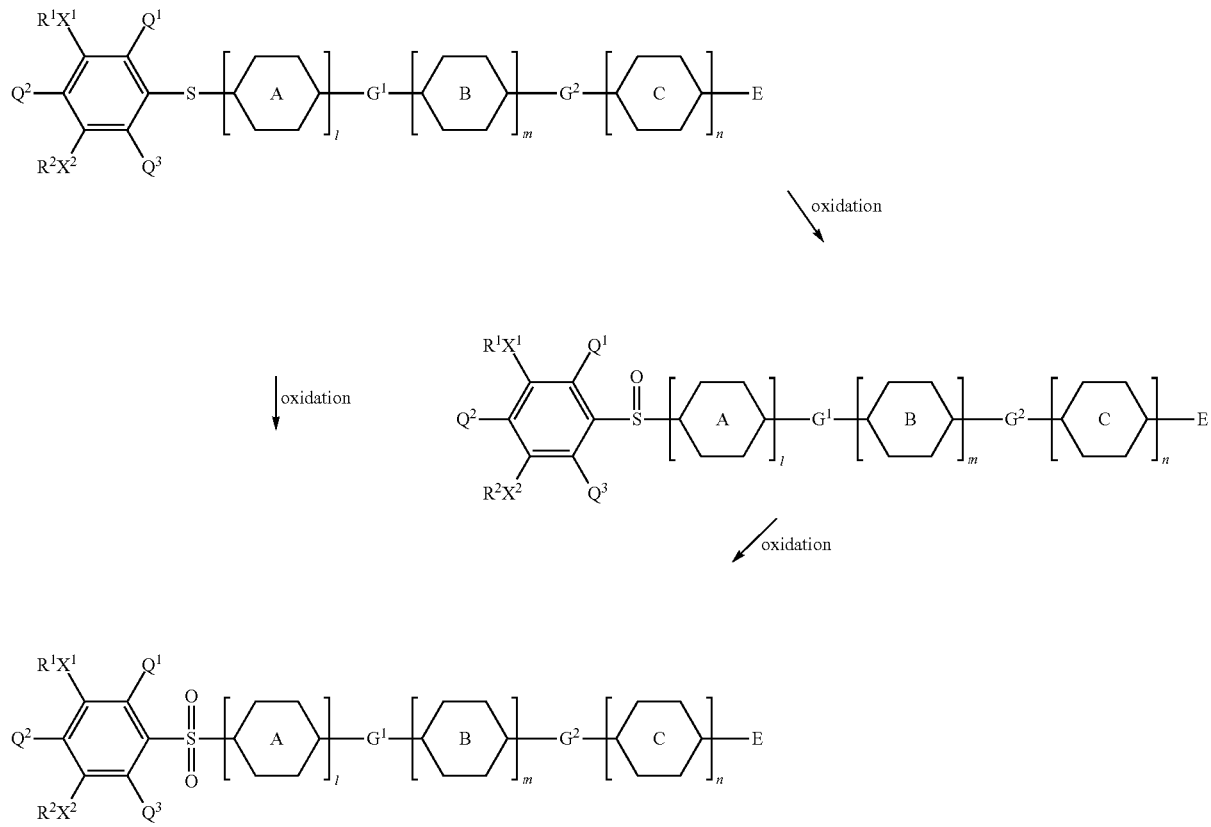
wherein ring A, ring B, ring C, l, m, n, $G^1$, $G^2$, $R^1$, $R^2$, $Q^1$, $Q^2$, $Q^3$, $X^1$, $X^2$ and E are same as defined in claim 9.
15. The resin composition as claimed in claim 9, wherein the compound is prepared by Reaction Scheme 4:
[Reaction Scheme 4]
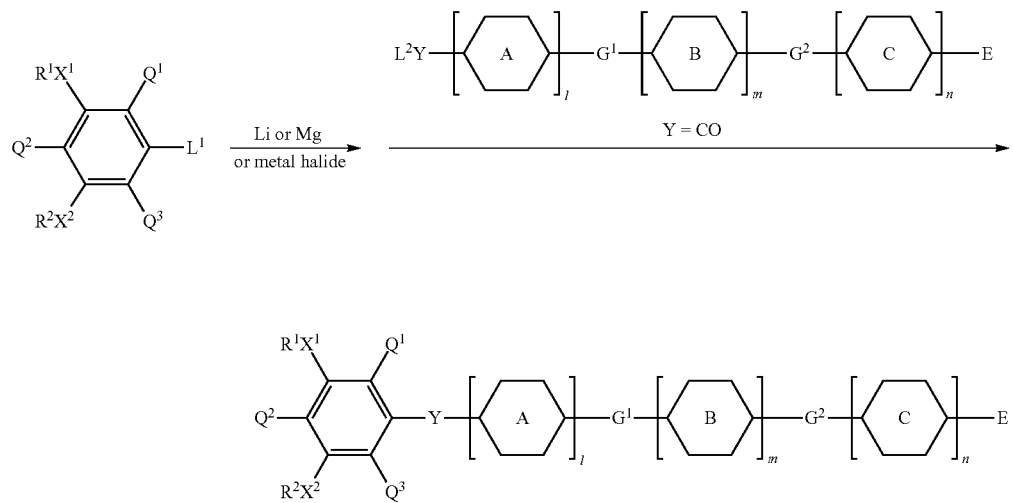

wherein ring A, ring B, ring C, l, m, n, $G^1$, $G^2$, $R^1$, $R^2$, $Q^1$, $Q^2$, $Q^3$, $X^1$, $X^2$ and E are same as defined in claim 9, and each of $L^1$ and $L^2$ independently represents halide, mesylate, tosylate, or triflate.

16. The resin composition as claimed in claim 9, wherein the compound is prepared by Reaction Scheme 5:

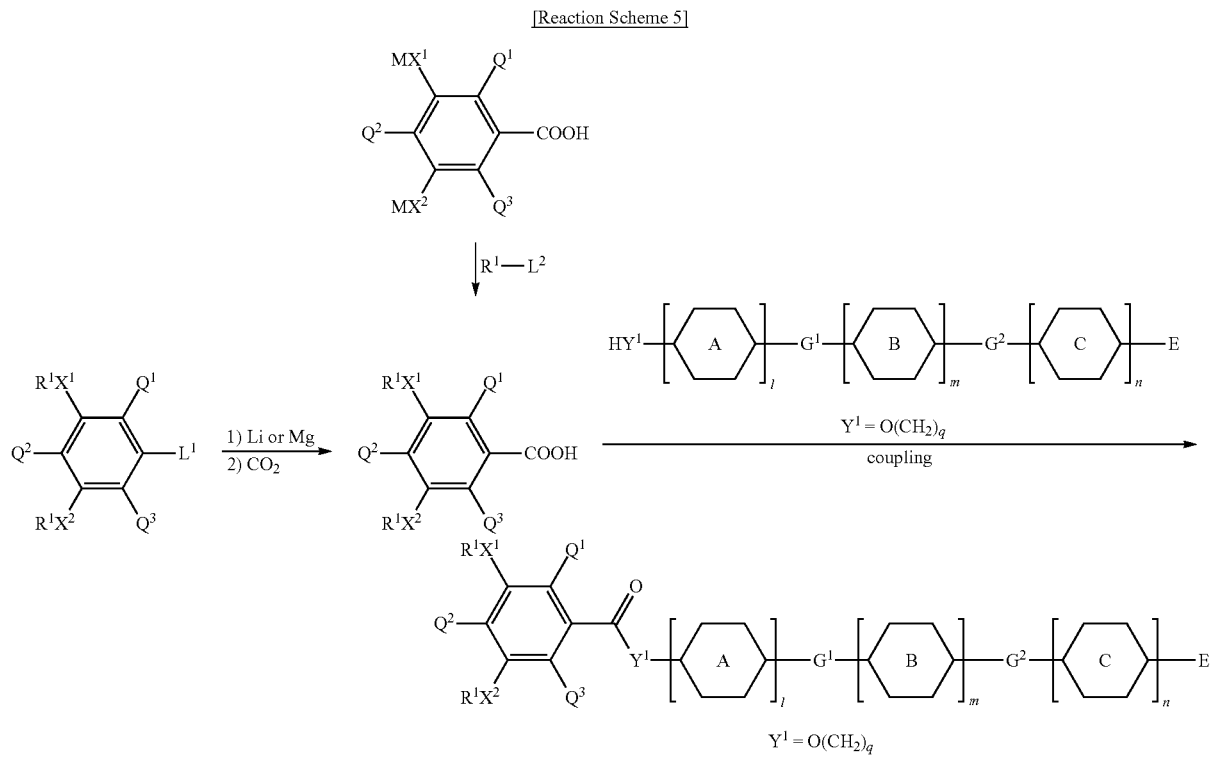

wherein ring A, ring B, ring C, l, m, n, q, $G^1$, $G^2$, $R^1$, $R^2$, $Q^1$, $Q^2$, $Q^3$, $X^1$, $X^2$ and E are same as defined in claim 9, each of $L^1$ and $L^2$ independently represents halide, mesylate, tosylate, or triflate, and M represents Li, Na, Mg, K, Ca, or Cs.

17. The resin composition as claimed in claim 9, wherein the compound is prepared by Reaction Scheme 6:

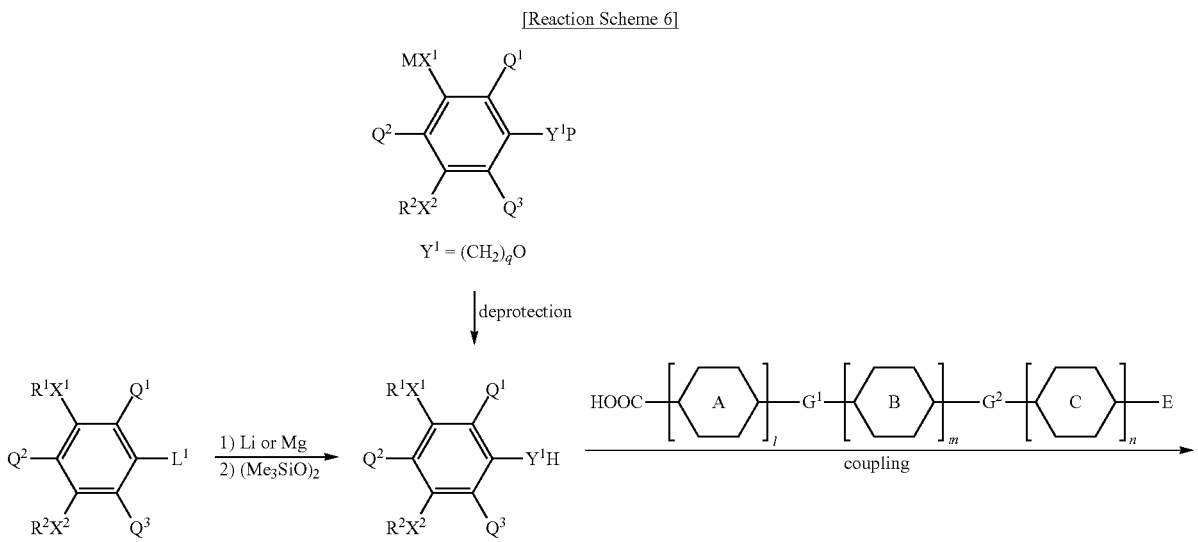

-continued
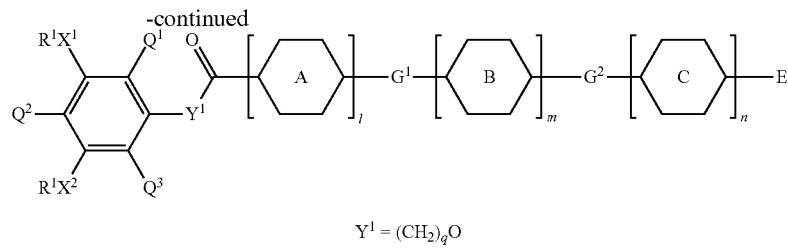
$Y^1 = (CH_2)_qO$
wherein ring A, ring B, ring C, l, m, n, q, $G^1$, $G^2$, $R^1$, $R^2$, $Q^1$, $Q^2$, $Q^3$, $X^1$, $X^2$ and E are same as defined in claim 9, each of $L^1$ and $L^2$ independently represents halide, mesylate, tosylate, or triflate, P represents a protection group, and M represents Li, Na, Mg, K, Ca, or Cs.
* * * * *